US010276922B2

(12) United States Patent
Mercer et al.

(10) Patent No.: US 10,276,922 B2
(45) Date of Patent: Apr. 30, 2019

(54) RADIATING STRUCTURE WITH INTEGRATED PROXIMITY SENSING

(71) Applicant: Microsoft Technology Licensing, LLC, Redmond, WA (US)

(72) Inventors: Sean Russell Mercer, Issaquah, WA (US); Charbel Khawand, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/822,945

(22) Filed: Nov. 27, 2017

(65) Prior Publication Data

US 2018/0248249 A1    Aug. 30, 2018

Related U.S. Application Data

(63) Continuation of application No. 14/152,351, filed on Jan. 10, 2014, now Pat. No. 10,044,095.

(51) Int. Cl.
*H01Q 1/24* (2006.01)
*H01B 19/00* (2006.01)
*H04B 1/04* (2006.01)
*H01Q 1/44* (2006.01)

(52) U.S. Cl.
CPC .............. *H01Q 1/24* (2013.01); *H01B 19/00* (2013.01); *H01Q 1/243* (2013.01); *H01Q 1/245* (2013.01); *H01Q 1/44* (2013.01); *H04B 1/04* (2013.01); *H04B 2001/0416* (2013.01); *Y10T 29/49018* (2015.01)

(58) Field of Classification Search
CPC .......... H01Q 1/24; H01Q 1/243; H01Q 1/245; H01Q 1/44; H04B 1/04; H04B 2001/0416; Y10T 29/49018; H01B 19/00
See application file for complete search history.

(56) References Cited

U.S. PATENT DOCUMENTS

| 4,016,490 | A | 4/1977 | Weckenmann et al. |
| 4,729,129 | A | 3/1988 | Koerner |
| 4,806,944 | A | 2/1989 | Jacomb-Hood |
| 5,166,679 | A | 11/1992 | Vranish et al. |

(Continued)

FOREIGN PATENT DOCUMENTS

| AU | 2014202603 B2 | 7/2015 |
| CN | 1123476 A | 5/1996 |

(Continued)

OTHER PUBLICATIONS

Ban, et al., "A Dual-Loop Antenna Design for Hepta-Band WWAN/LTE Metal-Rimmed Smartphone Applications", In Journal of IEEE Transactions on Antennas and Propagation, vol. 63, Issue 1, Jan. 2015, 8 pages.

(Continued)

*Primary Examiner* — Nikolay K Yushin
(74) *Attorney, Agent, or Firm* — Holzer Patel Drennan

(57) ABSTRACT

A wireless transmission system disclosed herein includes a radiating structure integrated into a computing device case that substantially encloses electronics of a computing device. The radiating structure includes an insulator that forms a boundary with the metal plate on the computing device case. A proximity sensor collects data from an exposure point located within the radiating structure.

23 Claims, 8 Drawing Sheets

(56) References Cited

U.S. PATENT DOCUMENTS

| | | |
|---|---|---|
| 5,212,621 A | 5/1993 | Panter |
| 5,408,690 A | 4/1995 | Ishikawa et al. |
| 5,564,086 A | 10/1996 | Cygan et al. |
| 6,178,310 B1 | 1/2001 | Jeong, II |
| 6,657,595 B1 | 12/2003 | Phillips et al. |
| 6,989,745 B1 | 1/2006 | Milinusic et al. |
| 7,009,944 B1 | 3/2006 | Hulbert |
| 7,053,629 B2 | 5/2006 | Nevermann |
| 7,062,288 B2 | 6/2006 | Raaf et al. |
| 7,071,776 B2 | 7/2006 | Forrester et al. |
| 7,124,193 B1 | 10/2006 | Raaf et al. |
| 7,146,139 B2 | 12/2006 | Nevermann |
| 7,151,382 B1 | 12/2006 | Kean et al. |
| 7,162,264 B2 | 1/2007 | Vance |
| 7,167,093 B2 | 1/2007 | Fergusson |
| 7,541,874 B2 | 6/2009 | Maeda et al. |
| 7,729,715 B2 | 6/2010 | Love et al. |
| 7,917,175 B2 | 3/2011 | Song et al. |
| 8,063,375 B2 | 11/2011 | Cobbinah et al. |
| 8,134,461 B2 | 3/2012 | Van Doorn |
| 8,208,423 B2 | 6/2012 | Liu et al. |
| 8,213,982 B2 | 7/2012 | Marlett et al. |
| 8,269,511 B2 | 9/2012 | Jordan |
| 8,324,549 B2 | 12/2012 | Romero et al. |
| 8,326,385 B2 | 12/2012 | Brogle et al. |
| 8,401,851 B2 | 3/2013 | Bushey |
| 8,417,296 B2 | 4/2013 | Caballero et al. |
| 8,432,322 B2 | 4/2013 | Amm et al. |
| 8,442,572 B2 | 5/2013 | Borran et al. |
| 8,466,839 B2 | 6/2013 | Schlub et al. |
| 8,483,632 B2 | 7/2013 | Arsani et al. |
| 8,515,496 B2 | 8/2013 | Cheng et al. |
| 8,520,586 B1 | 8/2013 | Husted et al. |
| 8,547,952 B2 | 10/2013 | Liu et al. |
| 8,548,388 B2 | 10/2013 | Chiu et al. |
| 8,559,999 B2 | 10/2013 | Hu et al. |
| 8,565,205 B2 | 10/2013 | Ho et al. |
| 8,577,289 B2 | 11/2013 | Schlub et al. |
| 8,723,531 B2 | 5/2014 | Harrison |
| 8,723,749 B2 | 5/2014 | Lin et al. |
| 8,775,103 B1 | 7/2014 | Jayaraj et al. |
| 8,781,437 B2 | 7/2014 | Ngai et al. |
| 8,792,930 B1 | 7/2014 | Gopalakrishnan et al. |
| 8,798,695 B1 | 8/2014 | Zheng et al. |
| 8,860,526 B2 | 10/2014 | Manssen et al. |
| 8,922,443 B2 | 12/2014 | Zhu et al. |
| 8,975,903 B2 | 3/2015 | Salter et al. |
| 9,093,752 B2 * | 7/2015 | Yarga ................ H01Q 5/328 |
| 9,325,355 B2 | 4/2016 | Pecen et al. |
| 9,337,833 B2 | 5/2016 | Siska |
| 9,466,872 B2 | 10/2016 | Sanchez et al. |
| 10,044,095 B2 | 8/2018 | Mercer et al. |
| 2002/0009976 A1 | 1/2002 | Rashidi |
| 2002/0039028 A1 | 4/2002 | Douglas et al. |
| 2002/0175814 A1 | 11/2002 | Wadlow et al. |
| 2003/0021608 A1 | 1/2003 | Morita et al. |
| 2003/0029028 A1 | 2/2003 | Watanabe et al. |
| 2003/0064732 A1 | 4/2003 | McDowell et al. |
| 2003/0064761 A1 | 4/2003 | Nevermann |
| 2003/0210203 A1 | 11/2003 | Phillips et al. |
| 2003/0214310 A1 | 11/2003 | McIntosh |
| 2003/0228846 A1 | 12/2003 | Berliner et al. |
| 2004/0021608 A1 | 2/2004 | Kojima et al. |
| 2004/0075613 A1 | 4/2004 | Jarmuszewski et al. |
| 2004/0108957 A1 | 6/2004 | Umehara et al. |
| 2004/0113847 A1 | 6/2004 | Qi et al. |
| 2004/0160378 A1 | 8/2004 | Abrams et al. |
| 2004/0222925 A1 | 11/2004 | Fabrega-Sanchez et al. |
| 2005/0017906 A1 | 1/2005 | Man et al. |
| 2005/0093623 A1 | 5/2005 | Ranganathan |
| 2005/0093624 A1 | 5/2005 | Forrester et al. |
| 2005/0184914 A1 | 8/2005 | Ollikainen et al. |
| 2006/0244663 A1 | 11/2006 | Fleck et al. |
| 2007/0037619 A1 | 2/2007 | Matsunaga et al. |
| 2007/0111681 A1 | 5/2007 | Alberth, Jr. et al. |
| 2007/0120745 A1 | 5/2007 | Qi et al. |
| 2007/0122307 A1 | 5/2007 | Da Costa et al. |
| 2008/0051165 A1 | 2/2008 | Burgan et al. |
| 2008/0055160 A1 | 3/2008 | Kim et al. |
| 2008/0158065 A1 | 7/2008 | Wee |
| 2008/0218493 A1 | 9/2008 | Patten et al. |
| 2008/0254836 A1 | 10/2008 | Qi et al. |
| 2009/0033562 A1 | 2/2009 | Takeuchi et al. |
| 2009/0047998 A1 | 2/2009 | Alberth, Jr. |
| 2009/0230884 A1 | 9/2009 | Van Doorn |
| 2009/0253459 A1 | 10/2009 | Naganuma et al. |
| 2009/0295648 A1 | 12/2009 | Dorsey et al. |
| 2009/0305742 A1 | 12/2009 | Caballero |
| 2009/0325511 A1 | 12/2009 | Kim |
| 2010/0026664 A1 | 2/2010 | Geaghan |
| 2010/0052997 A1 | 3/2010 | Kan et al. |
| 2010/0056210 A1 | 3/2010 | Bychkov et al. |
| 2010/0067419 A1 | 3/2010 | Liu et al. |
| 2010/0113111 A1 | 5/2010 | Wong et al. |
| 2010/0234058 A1 | 9/2010 | Hu et al. |
| 2010/0234081 A1 | 9/2010 | Wong et al. |
| 2010/0279751 A1 | 11/2010 | Pourseyed et al. |
| 2010/0283671 A1 | 11/2010 | Levin et al. |
| 2010/0283691 A1 | 11/2010 | Su et al. |
| 2010/0317302 A1 | 12/2010 | Greenwood et al. |
| 2010/0321325 A1 | 12/2010 | Springer et al. |
| 2011/0001675 A1 | 1/2011 | Lee |
| 2011/0012793 A1 | 1/2011 | Amm et al. |
| 2011/0012794 A1 | 1/2011 | Schlub et al. |
| 2011/0043408 A1 | 2/2011 | Shi et al. |
| 2011/0063042 A1 | 3/2011 | Mendolia et al. |
| 2011/0117973 A1 | 5/2011 | Asrani et al. |
| 2011/0124363 A1 | 5/2011 | Calvarese et al. |
| 2011/0157077 A1 | 6/2011 | Martin et al. |
| 2011/0199267 A1 | 8/2011 | Hayashi |
| 2011/0222469 A1 | 9/2011 | Ali et al. |
| 2011/0250928 A1 | 10/2011 | Schlub et al. |
| 2011/0298669 A1 | 12/2011 | Rao |
| 2012/0021707 A1 | 1/2012 | Forrester et al. |
| 2012/0021800 A1 | 1/2012 | Wilson et al. |
| 2012/0023225 A1 | 1/2012 | Imes et al. |
| 2012/0044115 A1 | 2/2012 | McCaughey et al. |
| 2012/0071195 A1 | 3/2012 | Chakraborty et al. |
| 2012/0074961 A1 | 3/2012 | Herrmann |
| 2012/0077538 A1 | 3/2012 | Yun |
| 2012/0133561 A1 | 5/2012 | Konanur et al. |
| 2012/0147801 A1 | 6/2012 | Ho et al. |
| 2012/0164962 A1 | 6/2012 | Lin et al. |
| 2012/0172079 A1 | 7/2012 | Baldemair et al. |
| 2012/0178494 A1 | 7/2012 | Haim et al. |
| 2012/0190398 A1 | 7/2012 | Leukkunen |
| 2012/0214422 A1 | 8/2012 | Shi et al. |
| 2012/0223865 A1 | 9/2012 | Li et al. |
| 2012/0231784 A1 | 9/2012 | Kazmi |
| 2012/0270519 A1 | 10/2012 | Ngai et al. |
| 2012/0270592 A1 | 10/2012 | Ngai et al. |
| 2012/0276861 A1 | 11/2012 | Isobe et al. |
| 2012/0295554 A1 | 11/2012 | Greene et al. |
| 2012/0298497 A1 | 11/2012 | Maeda et al. |
| 2012/0299772 A1 | 11/2012 | Shtrom et al. |
| 2012/0315847 A1 | 12/2012 | Li et al. |
| 2012/0329517 A1 | 12/2012 | Elin |
| 2012/0329524 A1 | 12/2012 | Kent et al. |
| 2013/0005413 A1 | 1/2013 | Brogle et al. |
| 2013/0016621 A1 | 1/2013 | Kil et al. |
| 2013/0026846 A1 | 1/2013 | Gianesello et al. |
| 2013/0033400 A1 | 2/2013 | Chiang |
| 2013/0045700 A1 | 2/2013 | Stallman et al. |
| 2013/0050046 A1 | 2/2013 | Jarvis et al. |
| 2013/0051261 A1 | 2/2013 | Kazmi et al. |
| 2013/0060517 A1 | 3/2013 | Sanchez |
| 2013/0120257 A1 | 5/2013 | Park et al. |
| 2013/0122827 A1 | 5/2013 | Ali et al. |
| 2013/0127677 A1 | 5/2013 | Lin et al. |
| 2013/0137487 A1 | 5/2013 | Sato |
| 2013/0149957 A1 | 6/2013 | Desclos et al. |
| 2013/0157564 A1 | 6/2013 | Curtis et al. |
| 2013/0169348 A1 | 7/2013 | Shi |
| 2013/0178167 A1 | 7/2013 | Lockerbie et al. |

(56) References Cited

U.S. PATENT DOCUMENTS

| | | | |
|---|---|---|---|
| 2013/0178174 A1 | 7/2013 | Geris et al. | |
| 2013/0203363 A1 | 8/2013 | Gratt et al. | |
| 2013/0210477 A1 | 8/2013 | Peter | |
| 2013/0217342 A1 | 8/2013 | Abdul-gaffoor et al. | |
| 2013/0241670 A1 | 9/2013 | Mikhemar et al. | |
| 2013/0278474 A1 | 10/2013 | Lenormand et al. | |
| 2013/0293244 A1 | 11/2013 | Leek | |
| 2013/0300618 A1 | 11/2013 | Yarga et al. | |
| 2013/0310105 A1 | 11/2013 | Sagae et al. | |
| 2013/0310106 A1 | 11/2013 | Wang et al. | |
| 2013/0314365 A1 | 11/2013 | Woolley et al. | |
| 2013/0335291 A1 | 12/2013 | Judson et al. | |
| 2014/0015595 A1 | 1/2014 | Van Ausdall et al. | |
| 2014/0021801 A1 | 1/2014 | Kao et al. | |
| 2014/0071008 A1 | 3/2014 | Desclos et al. | |
| 2014/0078094 A1 | 3/2014 | Yang | |
| 2014/0087663 A1 | 3/2014 | Burchill et al. | |
| 2014/0280450 A1 | 3/2014 | Luna | |
| 2014/0098491 A1 | 4/2014 | Wang | |
| 2014/0098693 A1 | 4/2014 | Tabet et al. | |
| 2014/0066124 A1 | 5/2014 | Novet | |
| 2014/0128032 A1 | 5/2014 | Muthukumar | |
| 2014/0139380 A1 | 5/2014 | Ouyang et al. | |
| 2014/0141733 A1 | 5/2014 | Wong et al. | |
| 2014/0152121 A1 | 6/2014 | Ku | |
| 2014/0155000 A1 | 6/2014 | Erkens | |
| 2014/0159980 A1 | 6/2014 | Finegold | |
| 2014/0173269 A1 | 6/2014 | Varoglu et al. | |
| 2014/0176938 A1 | 6/2014 | Yang et al. | |
| 2014/0177371 A1 | 6/2014 | Abbasi et al. | |
| 2014/0206297 A1 | 7/2014 | Schlub et al. | |
| 2014/0253392 A1* | 9/2014 | Yarga .................... | H01Q 5/328 343/702 |
| 2014/0274188 A1 | 9/2014 | Thorson | |
| 2014/0274189 A1 | 9/2014 | Moller et al. | |
| 2014/0292587 A1 | 10/2014 | Yarga et al. | |
| 2014/0307570 A1 | 10/2014 | Hong | |
| 2014/0315592 A1 | 10/2014 | Schlub et al. | |
| 2014/0357207 A1 | 12/2014 | Ma | |
| 2014/0357313 A1 | 12/2014 | Mercer et al. | |
| 2014/0370929 A1 | 12/2014 | Khawand et al. | |
| 2015/0031408 A1 | 1/2015 | Kalla et al. | |
| 2015/0053575 A1 | 2/2015 | Bridges et al. | |
| 2015/0141080 A1 | 5/2015 | Standing | |
| 2015/0169093 A1 | 6/2015 | Nakao | |
| 2015/0177371 A1 | 6/2015 | Abbasi et al. | |
| 2015/0199042 A1 | 7/2015 | Standing et al. | |
| 2015/0200444 A1 | 7/2015 | Mercer et al. | |
| 2015/0201385 A1 | 7/2015 | Mercer et al. | |
| 2015/0201387 A1 | 7/2015 | Khawand et al. | |
| 2015/0288074 A1 | 10/2015 | Harper et al. | |
| 2015/0303568 A1 | 10/2015 | Yarga et al. | |
| 2015/0382307 A1 | 12/2015 | Harper et al. | |
| 2016/0049978 A1 | 2/2016 | Mercer et al. | |
| 2016/0065260 A1 | 3/2016 | Heikura et al. | |
| 2016/0098053 A1 | 4/2016 | Khawand et al. | |
| 2016/0164563 A1 | 6/2016 | Khawand et al. | |
| 2016/0064801 A1 | 7/2016 | Lee et al. | |
| 2016/0204836 A1 | 7/2016 | Lee et al. | |
| 2018/0212313 A1 | 7/2018 | Harper | |

FOREIGN PATENT DOCUMENTS

| | | |
|---|---|---|
| CN | 1179864 A | 4/1998 |
| CN | 100504407 C | 9/2006 |
| CN | 101958455 A | 1/2011 |
| CN | 102064812 A | 5/2011 |
| CN | 102077234 A | 5/2011 |
| CN | 102089989 A | 6/2011 |
| CN | 202276339 U | 6/2012 |
| CN | 102714346 A | 10/2012 |
| CN | 102835036 A | 12/2012 |
| CN | 103248747 A | 8/2013 |
| EP | 0843421 | 5/1998 |
| EP | 1298809 | 4/2003 |
| EP | 1469550 A3 | 12/2004 |
| EP | 1732167 A1 | 12/2006 |
| EP | 2015548 B1 | 2/2010 |
| EP | 2276108 A1 | 1/2011 |
| EP | 2381527 A1 | 10/2011 |
| EP | 2383364 | 11/2011 |
| EP | 2405534 A1 | 1/2012 |
| EP | 2410661 | 1/2012 |
| EP | 2509229 A1 | 10/2012 |
| EP | 2568605 A1 | 3/2013 |
| EP | 2787780 A1 | 10/2014 |
| GB | 2380359 A | 4/2003 |
| GB | 2409345 A | 6/2005 |
| JP | 2002043957 A | 2/2002 |
| JP | 2007194995 A | 8/2007 |
| WO | 200042797 | 7/2000 |
| WO | 200148858 A3 | 7/2001 |
| WO | 2004015813 A1 | 2/2004 |
| WO | 2004091046 A1 | 10/2004 |
| WO | 2005018046 A1 | 2/2005 |
| WO | 2007043150 A1 | 4/2007 |
| WO | 2009149023 A1 | 12/2009 |
| WO | 2011051554 A1 | 5/2011 |
| WO | 2011058128 A1 | 5/2011 |
| WO | 2012152103 A1 | 2/2012 |
| WO | 2012061582 | 5/2012 |
| WO | 2012091651 | 7/2012 |
| WO | 2012113754 | 8/2012 |
| WO | 2012122113 A1 | 9/2012 |
| WO | 2012122116 A1 | 9/2012 |
| WO | 2012143936 | 10/2012 |
| WO | 2012176217 A1 | 12/2012 |
| WO | 2013011352 A1 | 1/2013 |
| WO | 2013101106 | 7/2013 |
| WO | 2013103948 | 7/2013 |
| WO | 2013141791 A1 | 9/2013 |
| WO | 2013165419 | 11/2013 |
| WO | 2013169527 A1 | 11/2013 |
| WO | 2014036532 A1 | 3/2014 |
| WO | 2015134117 A1 | 9/2015 |
| WO | 2015138248 A1 | 9/2015 |
| WO | 2016111897 A1 | 7/2016 |

OTHER PUBLICATIONS

Curto, et al., "Circular Loop Antenna Operating at 434 MHz for Medical Applications: Loop-Tissue Interaction", In Proceeding of: Irish Signals and Systems Conference, Jul. 2006, 6 pages.

Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.

Design of Printed Trace Differential Loop Antennas, http://www.silabs.com/Suppore%20Documents/TechnicalDocs/AN639.pdf, Retrieved on: Nov. 17, 2016, 28 pages.

"Digital, Silicon Microphone has 2.6×1.6mm2 Footprint", Published on: Dec. 28, 2005, Available at: http://news.thomasnet.com/fullstory/Digital-Silicon-Microphone-has-2-6-x-1-6-mm-footprint-471386.

Hochwald, et al "Minimizing Exposure to Electromagnetic Radiation in Portable Devices", In Proceedings of Information Theory and Applications Workshop, Feb. 5, 2012, pp. 7.

Holopainen, et al., "Broadband Equivalent Circuit Model for Capacitive Coupling Element-Based Mobile Terminal Antenna", In IEEE Antennas and Wireless Propagation Letters, vol. 9, Jul. 8, 2010, 4 pages.

I.B. Bonev et al, "Parametric Study of Antenna with Parasitic Element for Improving the Hearing Aids Compatibility of Mobile Phones and the Specific Absorption Rate in the Head", Proceedings in Progress in Electromagnetics Research Symposium, Marrakesh, Morocco, Mar. 20-23, 2011, 5 pages.

"Low SAR Solution for Tablet PC", Published on: Sep. 27, 2011, Available at: http://www.auden.com.tw/TRC/webspace/disk/AudenSARSolutiondatasheet_110927.pdf.

(56) References Cited

OTHER PUBLICATIONS

Mrazovac, "Reaching the Next Level of Indoor Human Presence Detection: An RF Based Solution", 11th International Conference on Telecommunications in Modern Satellite, Cable and Broadcasting Services, Oct. 16, 2013, 4 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Myllymaki, "Capacitive Antenna Sensor for User Proximity Recognition"; Academic dissertation to be presented with the assent of the Doctoral Training Committee of Technology and Natural Sciences of the University of Oulu for public defence in Arina-sali (Auditorium TA105), Linnanmaa, dated Nov. 30, 2012, 59 pages.
Osoinach, Bryce, "Proximity Capacitive Sensor Technology for Touch Sensing Applications", In White Paper of Proximity Sensing, 2007, 7 pages.
Ozyalcin, et al., "SAR Simulations in Wireless Communication and Safety Discussions in the Society", In Proceedings of Turkish Journal of Electrical Engineering & Computer Sciences, vol. 10, Issue 2, Dec. 31, 2013, 16 pages.
Pal, et al., "A low-profile switched-beam dual-band capacitively coupled Square Loop Antenna", In Proceedings of Antennas and Propagation Conference, Nov. 11, 2013, 5 Pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar. 2014, pp. 1204-1211.
Poutanen, "Interaction Between Mobile Terminal Antenna and User" Helsinki University of Technology Master's Thesis, Oct. 9, 2007, 100 pages.
Poutanen, et al., "Behavior of Mobile Terminal Antennas near Human Tissue at a Wide Frequency Range", In International Workshop on Antenna Technology: Small Antennas and Novel Metamaterials, Mar. 4, 2008, 4 pages.
Quddious, et al., "An inkjet printed meandered dipole antenna for RF passive sensing applications", In Proceedings of 10th European Conference on Antennas and Propagation, Apr. 2016, 4 Pages.
Rogerson, James, "Samsung reveals a folding phone-to-tablet prototype", http://www.techradar.com/us/news/phone-and-communications/mobile..nes/samsung-reveals-a-folding-phone-to-tablet-prototype-1197384,7 pages.
"SAR Evaluation Considerations for Laptop, Notebook, Netbook and Tablet Computers," Federal Communications Commission Office of Engineering and Technology Laboratory Division, May 28, 2013, 14 pages.
"Semtech Launches Smart Proximity Sensor for Short-Range Human Presence Detection & SAR Regulations in Mobile & Tablet PC Applications", Published on: Jul. 24, 2012, Available at: http://www.semtech.com/Press-Releases/2012/Semtech-Launches-Smart-Proximity-Sensor-for-Short-Range-Human-Presence-Detection-SAR-Regulations-in-Mobile-Tablet-PC-Applications.html.
Sterner, et al., "Development of an Antenna Sensor for Occupant Detection in Passenger Transportation", In Proceedings of Procedia Engineering, vol. 47, Sep. 9, 2012, 6 pages.
Toit, Riaan Du, "Using Proximity Sensing to Meet Mobile Device FCC SAR Reulations", Published on: Apr. 17, 2012, Available at: http://www.eetimes.com/General/PrintView/431201.
Office Action Issued in United Kingdom Patent Application No. 1219096.3, dated Jan. 28, 2016, 4 Pages.
Office Action Issued in Chinese Patent Application No. 201380055749.X, dated Jun. 6, 2016, 12 Pages.
Office Action Issued in Columbian Patent Application No. NC2016/0000122, dated Aug. 19, 2016, 2 Pages.
First Office Action and Search Report Issued in Chinese Patent Application No. 201480031132.9, dated Nov. 2, 2016, 10 Pages.
Office Action and Search Report Issued in Chinese Patent Application No. 201480033869.4, dated Dec. 19, 2016, 7 Pages.
"Second Office Action Issued in Chinese Patent Application No. 201380055749.X", dated Jan. 25, 2017, 10 Pages.
Office Action and Search Report Issued in Chinese Patent Application No. 201480063903.02, dated Apr. 19, 2017, 11 Pages.
International Searching Authority, United States Patent and Trademark Office, International Search Report and Written Opinion for Application No. PCT/US2013/066441, dated Dec. 12, 2013, 12 Pages.
International Searching Authority, United States Patent and Trademark Office, International Search Report and Written Opinion for Application No. PCT/US2014/042023, dated Aug. 29, 2014, 11 Pages.
International Searching Authority, United States Patent and Trademark Office, International Search Report and Written Opinion for Application No. PCT/US2014/039479, dated Sep. 19, 2014, 11 Pages.
International Searching Authority, United States Patent and Trademark Office, Search Report and Written Opinion for PCT/US2014/065856, dated Feb. 4, 2015, 10 pages.
International Preliminary Examining Authority, "Second Written Opinion", Application No. PCT/US2014/042023, dated Mar. 2, 2015, 6 Pages.
International Searching Authority, U.S. Patent and Trademark Office, International Search Report for PCT/US2014/072411, dated Mar. 27, 2015, 10 pages.
International Searching Authority, United States Patent and Trademark Office, International Search Report and Written Opinion for Application No. PCT/US2014/072412, dated Mar. 30, 2015, 12 Pages.
International Searching Authority, United States Patent and Trademark Office, International Search Report and Written Opinion for Application No. PCT/US2014/072414, dated Apr. 14, 2015, 9 Pages.
International Preliminary Examining Authority, United States Patent and Trademark Office, International Preliminary Report on Patentability, Application No. PCT/US2013/066441, dated May 7, 2015, 9 pages.
International Searching Authority, United States Patent and Trademark Office, International Preliminary Report on Patentability, Application No. PCT/US2014/039479, dated Jun. 15, 2015, 8 pages.
International Searching Authority, U.S. Patent and Trademark Office, International Search Report and Written Opinion for PCT/US2014/072413, dated Jul. 16, 2015, 16 pages.
International Searching Authority, U.S. Patent and Trademark Office, International Search Report and Written Opinion for PCT /US2015/037563, dated Aug. 31, 2015, 11 pages.
International Searching Authority, United States Patent and Trademark Office, Second International Search Report and Written Opinion for PCT/US2014/072412; dated Oct. 5, 2015, 11 pages.
International Preliminary Examining Authority, Second Written Opinion of the International Preliminary Examining Authority for PCT/2014/065856, dated Oct. 13, 2015, 6 pages.
Second Written Opinion Issued in PCT Application No. PCT/US2014/072411, dated Nov. 26, 2015, 7 Pages.
International Searching Authority, U.S. Patent and Trademark Office, Second Written Opinion of International Preliminary Examining Authority for PCT/US2014/072412, dated Dec. 4, 2015, 5 pages.
International Searching Authority, U.S. Patent and Trademark Office, Second Written Opinion of the International Preliminary Examining Authority for PCT/US2014/072414 dated Dec. 9, 2015, 29 pages.
International Searching Authority, U.S. Patent and Trademark Office, Second Written Opinion of the International Preliminary Examining Authority for PCT/US2014/072413 dated Dec. 17, 2015, 6 pages.
International Seraching Authority, U.S. Patent and Trademark Office, International Search Report and Written Opinion for PCT/US2015/062851, dated Feb. 5, 2016, 11 pages.
International Preliminary Examining Authority, International Preliminary Report on Patentability for PCT/US2014/065856, dated Feb. 10, 2016, 14 pages.
International Searching Authority, U.S. Patent and Trademark Office, International Search Report and Written Opinion for PCT/US2015/052769, dated Feb. 17, 2016, 27 pages.

(56) References Cited

OTHER PUBLICATIONS

International Preliminary Report of Patentability issued in PCT Application No. PCT/US2014/072412; dated Mar. 22, 2016, 7 pages.
International Preliminary Examining Authority, International Preliminary Report on Patentability for PCT/US2014/072411; dated Mar. 23, 2016, 8 pages.
International Preliminary Examining Authority, International Preliminary Report on Patentability for PCT/US2014/072414; dated Mar. 23, 2016, 7 pages.
International Preliminary Examining Authority, International Preliminary Report on Patentability for PCT/US2014/072413, dated Mar. 24, 2016, 7 pages.
International Preliminary Examining Authority, Second Written Opinion of the International Preliminary Examining Authority for PCT/2015/037563, dated Jun. 1, 2016, 5 pages.
Second Written Opinion Issued in PCT Application No. PCT/US2015/052769, dated Jul. 7, 2016, 5 Pages.
International Preliminary Examining Authority, International Preliminary Report on Patentability for PCT/US2015/037563, dated Sep. 13, 2016, 11 pages.
International Preliminary Examining Authority, International Preliminary Report on Patentability for PCT/US2015/052769, dated Sep. 29, 2016, 16 pages.
"Second Written Opinion Issued in PCT Application No. PCT/US2015/062851", dated Oct. 28, 2016, 8 Pages.
International Preliminary Examining Authority, International Preliminary Report on Patentability for PCT/US2015/062851, dated Feb. 22, 2017, 19 pages International Preliminary Examining Authority, International Preliminary Report on Patentability for PCT/US2015/062851, dated Feb. 22, 2017, 19 pages.
International Searching Authority, U.S. Patent and Trademark Office, International Search Report and Written Opinion for PCT/US2016/069056, dated Mar. 31, 2017, 17 pages.
Mercer, et al., "Dynamic Antenna Power Control for Multi-Context Device", U.S. Appl. No. 14/987,964, filed Jan. 5, 2016, 52 pages.
Standing, et al., "Radiofrequency-Wave-Transparent Capacitive Sensor Pad", U.S. Appl. No. 15/384,742, filed Dec. 20, 2016, 26 pages.
Harper et al., "Active Proximity Sensor With Adaptive Electric Field Control", U.S. Appl. No. 15/413,196, filed Jan. 23, 2016, 35 pages. Npharper et al., "Active Proximity Sensor With Adaptive Electric Field Control", U.S. Appl. No. 15/413,196, filed Jan. 23, 2017, 35 pages.
Harper, "Loop Antenna With Integrated Proximity Sensing", U.S. Appl. No. 15/412,997, filed Jan. 23, 2017, 32 pages.
"Non-Final Office Action", U.S. Appl. No. 14/152,351, dated Feb. 20, 2015, 10 pages.
"Non-Final Office Action", U.S. Appl. No. 13/905,088, dated Mar. 23, 2015, 37 pages.
"Non-Final Office Action", U.S. Appl. No. 14/152,652, dated Jul. 16, 2015, 9 pages.
"Non-Final Office Action", U.S. Appl. No. 14/152,086, dated Jul. 22, 2015, 13 pages.
"Non-Final Office Action", U.S. Appl. No. 14/152,529, dated Sep. 22, 2015, 18 pages.
"Non-Final Office Action", U.S. Appl. No. 13/918,846, dated Sep. 23, 2015, 16 pages.
"Non-Final Office Action", U.S. Appl. No. 14/152,086, dated Nov. 30, 2015, 19 pages.
"Non-Final Office Action", U.S. Appl. No. 14/562,212, dated Dec. 18, 2015, 16 pages.
"Non-Final Office Action", U.S. Appl. No. 14/927,287, dated Dec. 21, 2015, 28 pages.
"Final Office Action", U.S. Appl. No. 14/152,652, dated Dec. 23, 2015, 9 pages.
"Non-Final Office Action", U.S. Appl. No. 14/320,320, dated Jan. 21, 2016, 9 pages.
"Non-Final Office Action", U.S. Appl. No. 14/152,529, dated Jan. 22, 2016, 18 pages.
"Final Office Action", U.S. Appl. No. 13/918,846, dated Mar. 2, 2016, 20 pages.
"Non-Final Office Action", U.S. Appl. No. 14/152,652, dated Apr. 18, 2016 9 pages.
"Final Office Action Issued in U.S. Appl. No. 14/927,287", dated May 11, 2016, 34 Pages.
"Non-Final Office Action", U.S. Appl. No. 14/086,866, dated May 19, 2016, 7 pages.
"Non-Final Office Action", U.S. Appl. No. 13/918,846, dated Jun. 14, 2016, 21 pages.
"Final Office Action", U.S. Appl. No. 14/562,212, dated Jun. 17, 2016, 17 pages.
"Non-Final Office Action", U.S. Appl. No. 14/506,478, dated Jul. 1, 2016, 10 pages.
"Final Office Action", U.S. Appl. No. 14/320,320, dated Jul. 29, 2016, 10 pages.
"Non-Final Office Action", U.S. Appl. No. 14/086,866, dated Oct. 17, 2016, 7 pages.
"Final Office Action", U.S. Appl. No. 13/918,846, dated Oct. 26, 2016, 25 pages.
"Non-Final Office Action", U.S. Appl. No. 14/987,964, dated Nov. 30, 2016, 8 pages.
"International Search Report and Written Opinion Issued in U.S. Appl. No. PCT/US2018/012855", dated Apr. 11, 2018, 12 Pages.
"Office Action and Search Report Issued in China Patent Application No. 201480072727.9", dated Apr. 3, 2018, 8 Pages. (Without English Translation).
"Non Final Office Action Issued in U.S. Appl. No. 15/412,997", dated Nov. 1, 2018, 8 Pages.

* cited by examiner

RADIATING STRUCTURE WITH INTEGRATED PROXIMITY SENSING

CROSS-REFERENCE TO RELATED APPLICATIONS

The present application is a continuation of and claims benefit of U.S. patent application Ser. No. 14/152,351, filed Jan. 10, 2014 and entitled "RADIATING STRUCTURE WITH INTEGRATED PROXIMITY SENSING," which is specifically incorporated by reference for all that it discloses and teaches.

BACKGROUND

Antennas for computing devices present challenges relating to receiving and transmitting radio waves at one or more select frequencies. These challenges are magnified by a current trend of housing such computing devices (and their antennas) in metal cases, as the metal cases tend to shield incoming and outgoing radio waves. Shielding incoming and outgoing radio waves can decrease functionality of a computing device. In addition, government agencies have imposed regulations limiting radio frequency (RF) transmission power from some wireless electronic devices, such as tablet computers and mobile phones. However, reducing RF transmission power can also appreciably decrease performance of device features in some electronic devices.

SUMMARY

Implementations described and claimed herein address the foregoing by providing a radiating structure integrated into an exterior surface of a metal computing device case. The radiating structure includes an insulator forming a boundary with a metal plate at the exterior surface. At least one proximity sensor is positioned to detect proximity of a conductive body via an exposure point located on the radiating structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

In some jurisdictions, specific absorption rate (SAR) standards impose maximum energy absorption limits on electronic device manufacturers. These standards impose restrictions on the amount of electromagnetic radiation that may be emitted at any particular point within a given distance of a transmitting radio frequency (RF) antenna. Particular attention is given to radiation limits at distances within a few centimeters from the device (e.g., 0-3 centimeters), where users are likely to place a human body part near the transmitting antenna. Such restrictions may be satisfied by reducing transmitted carrier signal strength when a conductive body (e.g., a human body part) is detected in the proximity of the transmitting antenna.

Implementations of the disclosed technology include a radiating structure with integrated proximity sensing components that provide for dynamic alteration of transmission power of the radiating structure.

Figure 1:
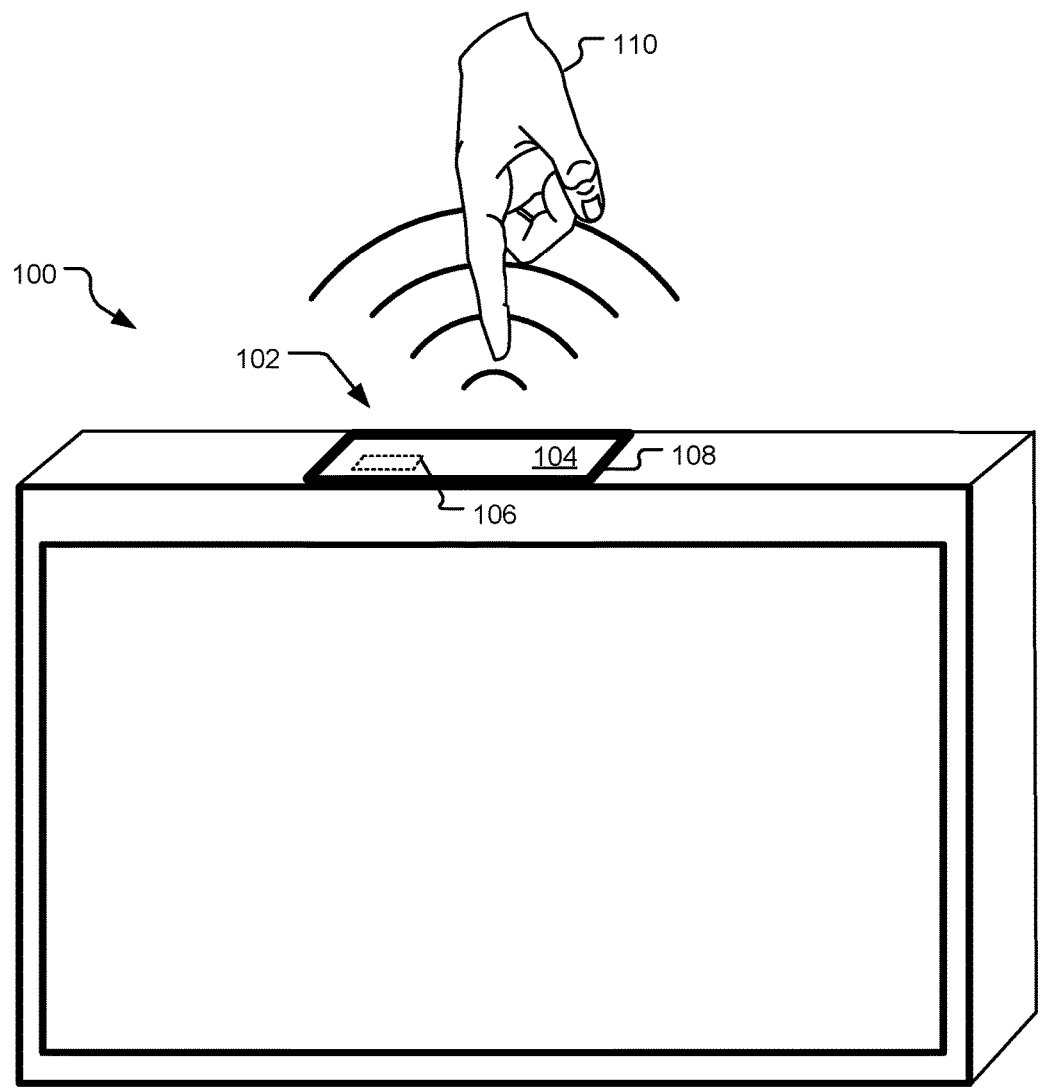
FIG. 1 illustrates an example metal computing device case that includes a radiating structure and components for capacitive proximity sensing.

FIG. 1 illustrates an example metal computing device case 100 that includes a radiating structure and components for capacitive proximity sensing. The metal computing device case 100 may be, without limitation, a casing of a tablet computer, laptop, mobile phone, personal data assistant, cell phone, smart phone, Blu-Ray player, gaming system, or any other device including wireless communications circuitry for transmitting a radio-frequency carrier wave.

The metal computing device case 100 includes antenna assembly 102 that forms a part of an exterior surface of the metal computing device case 100, such that an exposed portion of the metal computing device case 100 performs as a part of a radiating structure for operation of the antenna assembly 102. The antenna assembly 102 may be formed by, among other components, one or more metal plates (e.g., a metal plate 104), cut-outs, notches, or insulating components (e.g., an insulator 108). The insulator 108 insulates a boundary of at least one radiating component of the antenna assembly 102 and may be, for example, a plastic, ceramic or other dielectric insert or filling material. In FIG. 1, the insulator 108 bounds the antenna assembly 104 on four sides. Alternatively, a separate insulator may be employed on one or more sides of the metal plate 104. A variety of other implementations are disclosed herein or otherwise contemplated.

The antenna structure 102 is coupled to a radio (not shown) that generates a carrier wave, such as a radio frequency (RF) wave. The antenna assembly 102 may be designed to resonate at one or more particular frequencies, and/or, for certain applications may be designed to radiate very limited, or substantially zero, power at a particular frequency or set of frequencies. In one implementation, the antenna structure 102 represents an active antenna radiating at a mobile telephone RF frequency. Other implementations are also contemplated.

The metal electronic device case 100 also includes a proximity sensing system 106 (shown as positioned behind or beneath the metal plate 104) including at least detection circuitry and one or more proximity sensors. Proximity sensors included in the antenna assembly 102 may include without limitation one or more of a capacitance sensor, an infrared sensor, an RGB sensor, a thermal sensor, a microphone, a stereoscopic sensor, a scanned laser sensor, an ultrasound sensor, and a millimeter wave sensor, etc. Proximity may be detected optically using time-of-flight or structure light methods.

The proximity sensors of the proximity sensing subsystem 106 collect data from one or more exposure points located within the antenna assembly 102 of the metal electronic device case 100. As used herein, an "exposure point" is an area located within the antenna assembly or on an exterior surface of the metal computing device case 100 from which proximity data is collected (e.g., a capacitive sensor pad, an infrared transparent or translucent port, a window port, etc.). In one implementation, the exposure point provides a field of sensing (e.g., a field of view, a capacitive coupling, an RF field, an audio signal field, etc.) that is exterior to the metal computing device case 100, such that the exposure point is substantially transparent to the proximity sensing element. The proximity sensing element may be on the surface of the metal computing device case 100 or within the metal computing device case 100. Examples of substantially transparent exposure points include without limitation a non-metallic surface for a capacitive sensor, an IR transparent sensor for an IR sensor, a speaker/microphone for an audio sensor, etc.

"Proximity data" refers to data from which a distance between the antenna assembly 102 and a conductive object (e.g., a human) can be inferred. Examples of proximity data include without limitation thermal profiles, capacitance measurements, acoustic reflections, etc. In yet another implementation, the frequency shift of a resonant RF element may be used to infer proximity (e.g., a patch antenna will detune (lower in frequency) when brought very close to a dielectric body). One could use this dielectric loading effect and resulting frequency shift to infer proximity.

The exposure points may be located on the metal plate 104, the insulator 108, or other metal or non-metal components that operate as part of the radiating structure. Additionally, exposure points can be located within one or more holes formed in an exterior surface of the antenna assembly 102. The position of each of the exposure points is associated with a location of transmitting components of the antenna assembly 102. Thus, proximity data collected at the exposure points allows for human proximity detection in the area proximal to such transmitting components. For example, SAR regulations impose particular limits on electromagnetic radiation transmissions when a human body part is within zero to three centimeters of a transmitting antenna. Thus, exposure points are, in one implementation, positioned so that proximity data collected at each of the exposure points may assist in a determination of whether a human body part is within three centimeters of the antenna assembly 102.

In one implementation, the proximity sensing subsystem 106 projects a signal, such as an electrical field, visible light (e.g., RGB light), invisible light (e.g., IR light), acoustic waves, etc., into a field of view. The signal is reflected from the field of view, and the reflected signal is detected at one or more exposure points on the radiating structure 102. In another implementation, the proximity sensing subsystem 106 utilizes one or more passive sensors (e.g., a thermal sensor, an electric field sensor, etc.) to detect a signal emitted or radiated from the field of view. In yet another implementation, the proximity sensing subsystem 106 includes an IR illuminator and an IR sensor to detect reflected IR light emitted from the IR illuminator.

The proximity sensing subsystem 106 also includes detection circuitry for processing proximity data collected by the proximity sensors. For example, the processing circuitry may include hardware, firmware, and/or software to identify a correlation between saved information (e.g., information associated with human proximity to one or more proximity sensors) and observed waveforms, temperature profiles, depth maps, etc. The proximity sensing subsystem 106 may also be coupled to control circuitry (not shown) to vary a behavior (e.g., transmission power level, output wave frequency, etc.) of the antenna assembly 102 responsive to variations in proximity data collected by the proximity sensors.

In one implementation, the proximity sensing subsystem 106 alters a behavior of the antenna assembly 102 when proximity data collected by the proximity sensors satisfies a human proximity condition. The human proximity condition may take on a variety of values and forms depending upon the type(s) of proximity sensors utilized. For example, a human proximity condition may be satisfied when an IR sensor detects a thermal profile indicative of a particular object (e.g., a human hand 110) within a certain distance of the radiating structure 102. In another implementation, which may include a time-of-flight camera or system, a human proximity condition is satisfied when a transmitted light pulse (RGB, IR, etc.) is reflected back to a proximity sensor within a predetermined time interval, indicating that a reflective object is within a given distance of the antenna assembly 102. Distance may be determined by measuring a phase shift between a transmitted signal and the reflected signal, the time difference between a transmitted light pulse and the reflected light pulse, the magnitude of reflected light detected during a shutter period. In still yet another implementation, a human proximity condition is satisfied when a capacitance sensing chip detects an AC voltage change that exceeds a stored threshold value, indicating that an object is within a given distance of the antenna assembly 102. A variety of other implementations is also contemplated.

Figure 2:
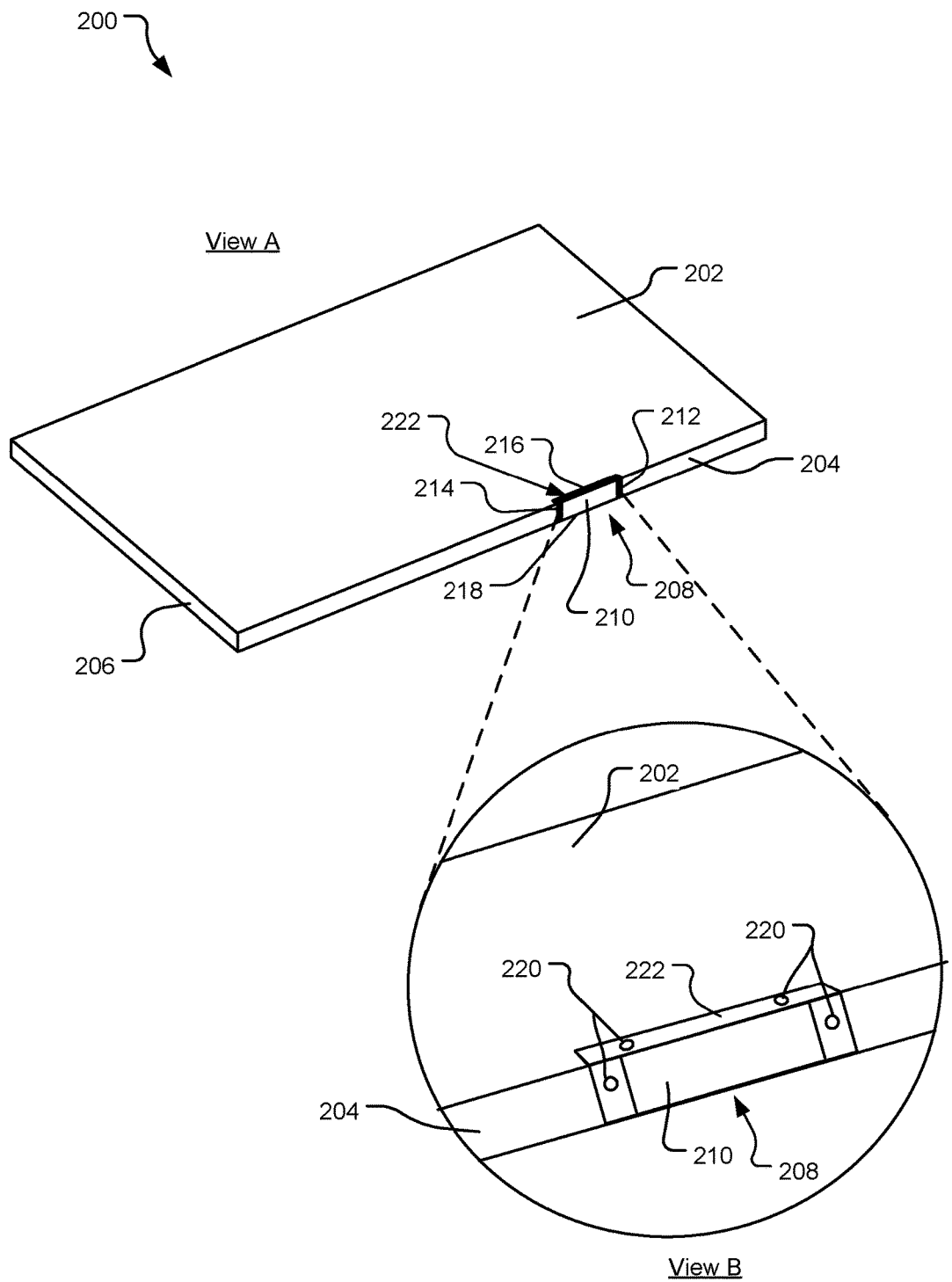
FIG. 2 illustrates another example metal computing device case that includes a radiating structure and components for proximity sensing.

FIG. 2 illustrates an example metal computing device case 200 that includes a radiating structure and components for proximity sensing. As illustrated in View A, the metal computing device case 200 includes a back face 202, a front face (not shown), and four side faces including visible side faces 204 and 206. The four side faces bound the back face 202 and the front face. In other implementations, fewer than four sides may partially bound the back face 202. In addition, the back face 202 and one or more of the side faces may be joined at an abrupt corner, at a curved corner (e.g., a continuous arc between the back face and the side face), or in various continuous intersecting surface combinations. Furthermore, the side faces need not be perpendicular to the back face (e.g., a side face may be positioned at an obtuse or acute angle with the back face). In one implementation, the back face and one or more side faces are integrated into a single piece construction, although other assembled configurations are also contemplated.

An antenna assembly 208 forms a part of the metal computing device case 200 and functions to transmit a carrier wave, such as an RF wave. As illustrated, the antenna assembly 208 includes a metal plate 210 (e.g., part of the metal side face 204 of the metal computing device case 200 or another metal plate) separated from the metal side face 204, the metal back face 202, and the front face (not shown) by three cut-out slots 212, 214, and 216. It should be understood that the metal plate 210 may alternatively be formed as part of the back face 202 of the metal computing device case 200. The exterior surface of the metal plate 210 is exposed (e.g., the surface of the metal plate 210 is exposed to a user's environment, touchable by a user, etc.), and the interior surface of the metal plate 210 is coupled to a feed structure (not shown) within the interior of the metal computing device case 200. Multiple such antenna structures may be formed in the metal back face 202 or any metal side face of the metal computing device case 200. Alternatively, one or more antennas may be formed below the exterior surface of a computing device for which the exterior surface is non-conductive, or semi-conductive, e.g., a polycarbonate material.

The metal back face 202 and various metal side faces generally form a back section of the metal computing device case 200 in which electronic and mechanical components of the computing device are located. A front face (not shown) typically includes a display surface, such as a touch screen display. The front face is assembled to the back section of the metal computing device case 200 to enclose the electronic components of the computing device, including at least one processor, tangible storage (e.g., memory, magnetic storage disk), display electronics, communication electronics, etc.

An insulator 222, which may be plastic or other dielectric material, fills each of the cut-out slots 212, 214, and 216. The insulator 222 provides insulation between the metal plate 210 and adjacent edges of the metal back face 202 and metal side face 204. Although not shown, the metal plate 210 is also insulated from the front face by a dielectric material, an insulating gasket, contact with a glass layer in the front section of the device, etc.

View B illustrates a magnified view of a portion of the metal computing device case 200 including the antenna assembly 208. A plurality of proximity sensors (not shown) collects data from exposure points 220 on one or more exposed surfaces of the metal computing device case 200. For example, an exposure point may be a region on an opaque or translucent exterior surface or a hole (e.g., a slot or aperture) in an exterior surface. In FIG. 2, the exposure points 220 are regions on an exterior surface of the insulator 222. In one implementation, the insulator 222 is translucent such that one or more sensors behind or embedded within the insulating material can make use of an exposed field of view through the insulator 222 and to a user environment. In another implementation, the insulator 222 is opaque and the proximity sensors collect data through the insulator 222 without utilizing an exposed field of view to the user environment. An opaque exposure point may be used where the detection method is based on signals that can pass through an opaque material, such as colored polycarbonate plastic, without significant attenuation. Such materials would be considered substantially transparent to the proximity sensing element. Ultrasonic audio emitters used in Doppler-type distance measurement systems may also be placed behind opaque materials given that audio signals in certain frequency ranges may pass through opaque materials without being attenuated below a detectable level.

One or more proximity sensors positioned within the metal computing device case 200 collect proximity data via the exposure points 220. For example, a plurality of IR sensors may be included within the metal computing device case 200 and each positioned in alignment with a corresponding exposure point so as to collect proximity data from a field of view visible through each of the exposure points. The positioning and number of the proximity sensors 220 may vary depending on design criteria. In FIG. 2, exposure points are located on two different surfaces of the metal computing device case 200 (e.g., on the insulator inserts in the slots in the back surface 202 and the side surface 204). In other implementations, the exposure points are located on a single surface or three or more surfaces of the metal computing device case 200.

Figure 3:
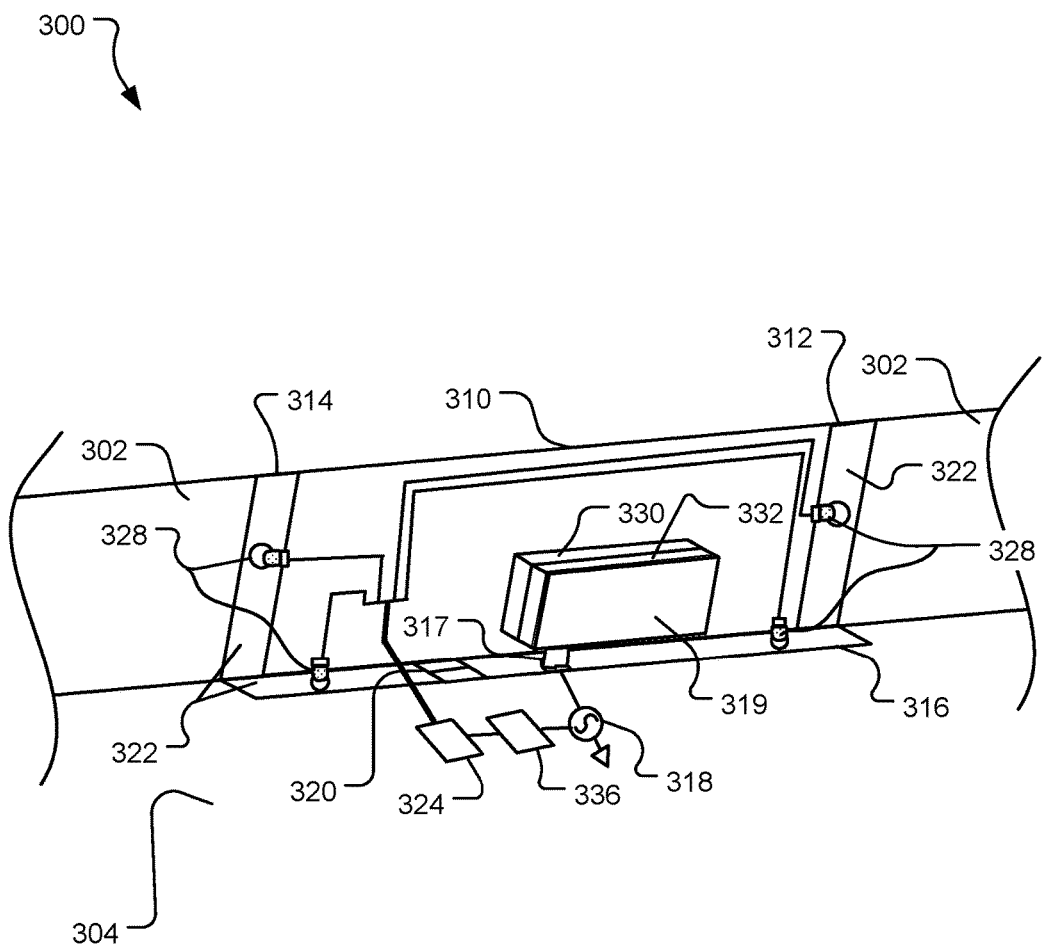
FIG. 3 illustrates another example of a system that includes a radiating structure and components for proximity sensing.

FIG. 3 illustrates another example of a system 300 that includes a radiating structure and components for proximity sensing. The system 300 is formed as part of a metal electronic device case including a metal side face 302, a metal back face 304, and a metal plate 310. The metal plate 310 forms an exterior metal surface of the metal computing device. An insulator 322 electrically insulates the metal plate 310 from the metal side face 302 and the metal back face 304 by filling slots 312, 314, and 316 and providing insulation between the metal plate 310 and the metal side face 302 and between the metal plate 310 and the metal back face 304, closing gaps in the metal computing device case. In some implementations, the insulator may have a voltage-dependent dielectric constant.

A radiating function (e.g., transmission of a carrier wave) is performed in part by a high dielectric constant ceramic block 332 capacitively coupled to the metal plate 310 coupled across a dielectric spacer 330. The dielectric spacer 330 is fed by the feed structure 317, which is electrically connected between a radio 318 and a metallized surface 319 on the ceramic block 332. The radio 318 is attached to a printed circuit board (PCB) (not shown). The ceramic block 332 may operate as the only an active antenna structure or may operate as an active antenna relative to a parasitic antenna including the metal plate 310 and the rest of the surrounding metal computing device case.

The metal plate 310 is connected to the ground plane of the metal back face 304 via a series and/or parallel resonant circuit 320 (e.g., including an inductor and/or capacitor), which may allow for multi-band operation. Proximity sensors 328 are positioned within the metal computing device case and adjacent to each of a plurality of holes or translucent portions of the insulator 322 (e.g., adjacent to each of the exposure points illustrated in FIG. 2). In another implementation, the proximity sensors 328 are embedded within material of the insulator 322 rather than positioned adjacent to it, as shown. Each of the proximity sensors 328 is coupled to a proximity detection circuit 324 mounted on a PCB within the metal electronic device case.

The proximity detection circuit 324 may include, for example, hardware (e.g., an integrated circuit, microprocessor, tangible storage such as memory, etc.) or hardware in combination with software and/or firmware, configured to adjust a transmission power of the radiating structure based on input from the proximity sensors 328. For example, the proximity detection circuit 324 may process data from the proximity sensors 328 to determine whether a human proximity condition is satisfied. In one implementation, the proximity detection circuit 324 compares a measured IR temperature profile to a stored temperature profile of a human. In an IR-based proximity detection system, proximity sensors 328 may detect infrared light radiated from an object. For example, as a human hand approaches the metal plate 310, proximity sensors 328, which may be IR detectors, will begin to detect infrared radiation emitted from the human hand. Each proximity sensor 328 may detect varying levels of infrared radiation based on the velocity and angle-of-approach of the approaching hand. The proximity detection circuit 328 may analyze signals from the proximity 328 to determine that the approaching object is indeed a human hand. Proximity detection circuit 328 may include, or have access to, predetermined data representing sensor signals for a scenario of an approaching human hand. The real-time detected data may be compared to the predetermined data to determine that the object is a human hand at a particular distance from the proximity sensors 328. Predetermined data for various objects at various distances may be stored to enable proximity detection circuit 328 to accurately estimate, for example, the composition and proximity of the object. IR radiation detection may advantageously provide information about the composition of an object. For example, inanimate objects may have a heat signature that is very different from the heat signature of a human hand.

In another implementation, the proximity detection circuit 324 compares a measured light travel time (e.g., an out-and-back time of a light pulse in the IR or visible light spectrum, or a phase shift of modulated light) to a stored threshold associated with a proximity between an object and the system 300. Similar to the example above regarding the infrared proximity detection system, a proximity detection circuit 324 based on time-of-flight may include predetermined data representing time-of-flight measurements objects and proximities. The aggregated data of all four proximity sensors 328 may be analyzed to determine that an approaching object is a pencil, a human hand, a tabletop, etc., because each of these objects may have different absolute differences from the object to a given sensor. Proximity detection circuit 324 may be operable to combine and analyze the data collected from several proximity sensors to estimate the size of an object and the object's distance, to determine whether to reduce the transmitted power, and if so, by how much, as further explained below.

In one implementation, the previously mentioned RF frequency shift configuration includes a resonant RF structure (e.g., a patch antenna element) and a swept frequency RF excitation applied to it. The frequency range includes the structure's resonant frequency and is wide enough to cover the extent of the detuned resonant frequency that occurs when a dielectric object is brought near the structure. RF monitoring circuitry can observe signal amplitude and/or phase across frequency (and RF match). Changes in resonant frequencies can be used to infer proximity of dielectric bodies.

The proximity detection circuit 324 is communicatively coupled to a power control circuit 336 that controls power to one or more transmitting components of the system 300, such as the radio 318 or the feed structure 317. This coupling allows the power control circuit 336 to dynamically adjust transmission power of the system 300 based on input from the proximity detection circuit 324. For example, the proximity detection circuit 324 may provide the power control circuit 336 with a signal when a stored human proximity condition is satisfied. Responsive to this signal, the power control circuit 336 dynamically adjusts transmission power of radiating components of the system 300.

Figure 4:
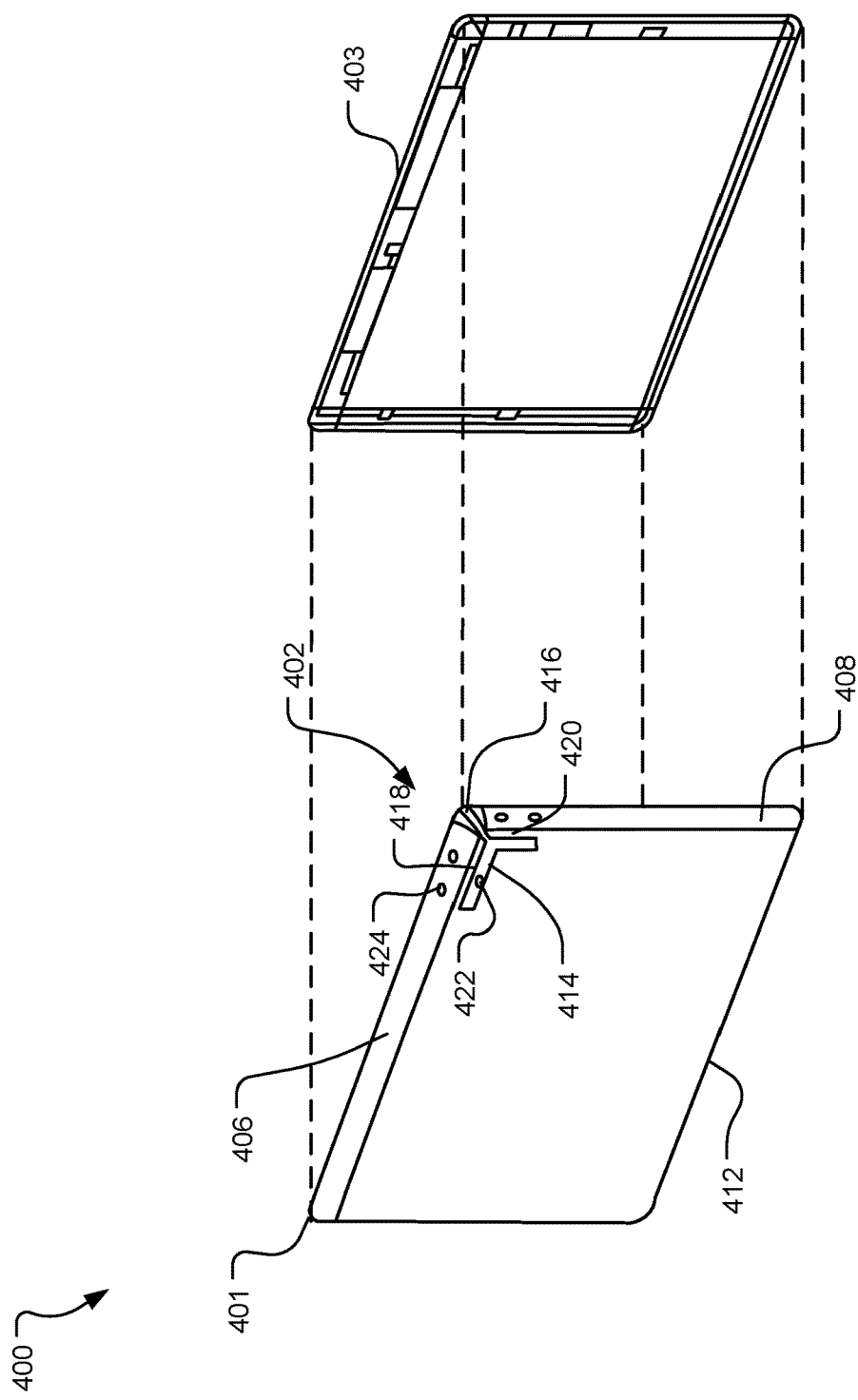
FIG. 4 illustrates two portions of an example metal computing device case that includes a radiating structure and components for proximity sensing

FIG. 4 illustrates two portions 401 and 403 of an example metal computing device case that includes a radiating structure and components for proximity sensing. The portion 403 typically contains a display assembly while the portion 401 typically encloses (at least partially) most other components of the computing device. The metal computing device case 400 includes a back face 404 and four side faces 406, 408, 410, and 412 bounding the back face.

In the illustrated implementation, a back face antenna assembly 402 is integrated as a part of the metal computing device case 400. The back face antenna assembly 402 includes cut-out 414 (also referred to as an aperture or slot) created in the back face 404. In FIG. 4, the cut-out 414 is shown as L-shaped with segments parallel to two adjacent side faces of the computing device case 400. However, other configurations are also contemplated. The back face antenna assembly 402 also includes a notch 416 cut from the back face that cuts through the corner of two intersecting side faces (e.g., the side faces 408 and 406). The cut-out 414 and notch 416 form at least one elongated metal arm (e.g., elongated metal arms 418 and 420) from the areas of the computing device case 400 surrounding the cut-out 414 and notch 416.

A carrier wave signal is fed to one of the elongated metal arms 418 or 420, such as by way of a feed structure (e.g., a conductive wire or strip) coupled between the elongated metal arm 418 and a radio (not shown). The cut-out 414, notch 416, and the elongated metal arms 418 and 420 perform a radiating function of the back face antenna assembly 402. In one implementation, the cut-out 414, notch 416, and the elongated metal arms 418 and 420 transmit a carrier wave. The dimensions of the cut-out 414 influence the impedance matching for different radio frequency bands, while the size and shape of a conductive feed structure (not shown) influences the resonant frequencies of the radiating structure 402.

The elongated arms 418 and 420 can be excited directly (e.g., galvanically, like a Planar Inverted-F Antenna), capacitively, or via some other excitation method. The cut-out 414 and notch 416 may be filled with an insulator, such as a plastic insert, ceramic, or other dielectric material, which may have a voltage-dependent dielectric constant. Such a radiating structure may be designed to resonate at one or more particular frequencies, and/or, for certain applications, may be designed to radiate very limited, or substantially zero, power at a particular frequency or set of frequencies.

One or more proximity sensors (not shown) collect data from corresponding exposure points (e.g., exposure points 422 and 424) of the metal electronic device case 400. An exposure point may be, for example, a region on an opaque or translucent exterior surface of the metal computing device case 400 or a hole (e.g., a slot or aperture) formed in an exterior surface of the metal computing device case 400. In FIG. 4, the exposure points are illustrated on the insulating material within the cut-out 414 (e.g., the exposure point 422) and along the metal side faces 406 and 408 (e.g., the exposure point 424). Multiple exposure points may feed into one proximity sensor, for example, by using lenses and/or mirrors to pipe light from one emitter and to one detector. Alternatively, each exposure point may be associated with one emitter/detector pair. For those proximity detection systems that do not require and emitter (e.g., infrared radiation detection), each exposure point may be associated with a single IR sensor or with multiple IR sensors.

In one implementation, the insulating material in the cut-out 414 is translucent such that one or more sensors behind or embedded within the insulating material can make use of an exposed field of view through the insulating material to a user environment. In another implementation, the insulating material is opaque and the proximity sensors collect data through the insulating material without utilizing an exposed field of view to the user environment. Similarly, the exposure points on the side faces 406 and 408 may be translucent or opaque surface regions or inserts. In various implementations, the positioning and number of the proximity sensors and exposure points may vary depending on design criteria.

Each of the proximity sensors included in the metal electronic device case 400 is coupled to a proximity detection circuit (not shown), which is communicatively coupled to one or more transmitting components of the back face antenna assembly 402, such as a radio or feed structure internal to the electronic device case 400. The proximity detection circuit dynamically adjusts transmission power of the back face antenna assembly 402 based on the input from the proximity sensors.

Figure 5:
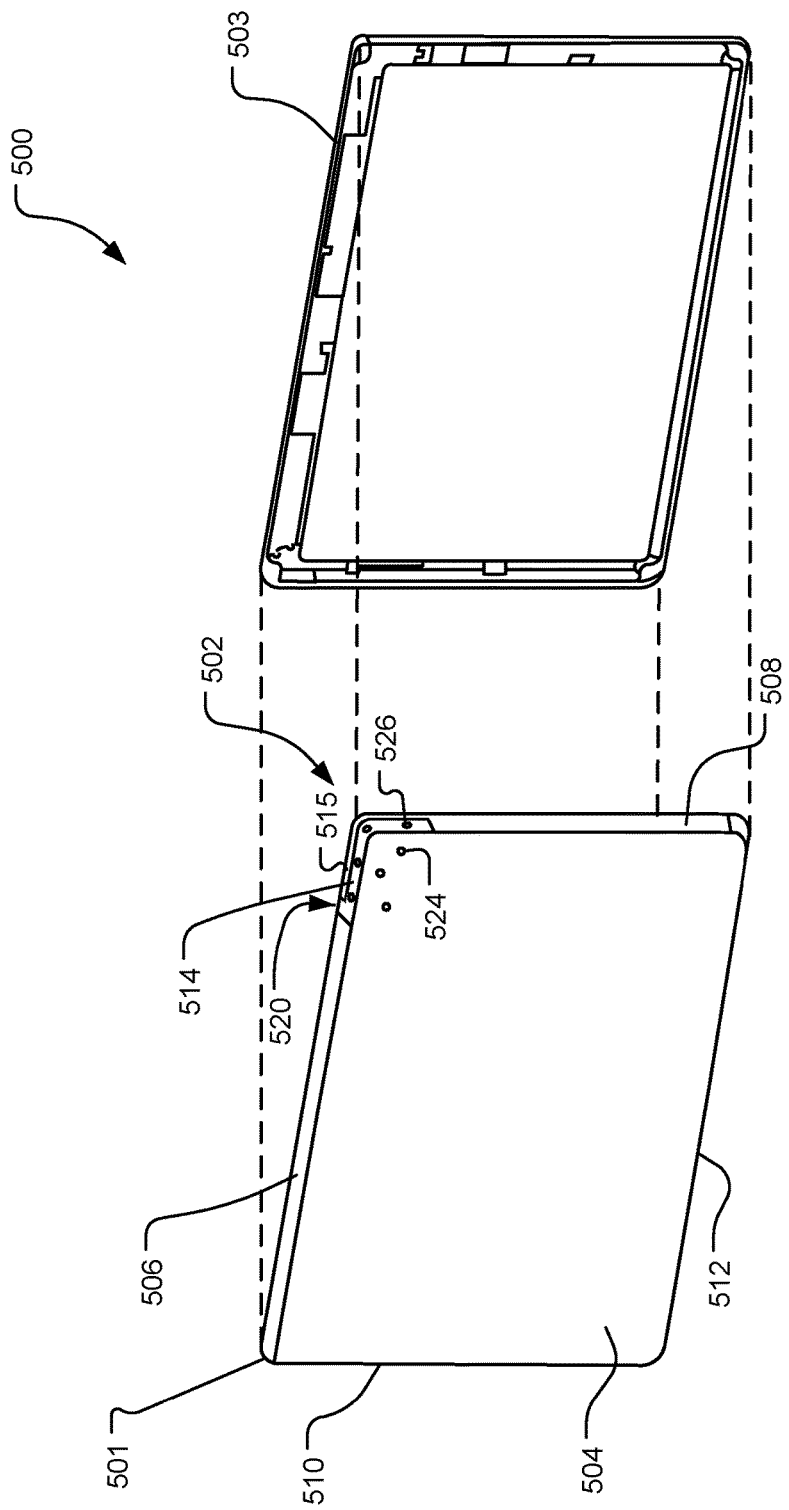
FIG. 5 illustrates two portions of yet another example computing device case that includes a radiating structure and components for proximity sensing.

FIG. 5 illustrates two portions 501 and 503 of an example computing device case 500 that includes a radiating structure and components for proximity sensing. In the illustrated implementation, a side face antenna assembly 502 is integrated as part of the metal computing device case 500. The metal computing device case includes a back face 504 and four side faces 506, 508, 510, and 512 bounding the back face 504.

The side face antenna assembly 502 includes a cut-out 514 created in one or more of the side faces (in this case, in side faces 506 and 508). The side face antenna assembly 502 also includes a notch 520 cut through an edge portion (i.e., an elongated metal arm 515) of the side face 506. In FIG. 5, the cut-out 514 is L-shaped and formed along two adjacent side faces of the computing device case. An insulating material, such as a plastic, ceramic, or other insulating material, fills both the cut-out 514 and the notch 520. In at least one implementation, the insulating material is a translucent material permeable by visible or invisible (e.g., IR) light.

The elongated metal arm 515, cut-out 514, and notch 520 perform a radiating function of the side face antenna assembly 502. The elongated arm 515 can be exited directly (e.g., galvanically, like a Planar Inverted-F Antenna), capacitively, or via some other excitation method. Such a radiating structure may be designed to resonate at one or more particular frequencies, and/or, for certain applications, may be designed to radiate very limited, or substantially zero, power at a particular frequency or set of frequencies.

A carrier wave signal is fed to the elongated metal arm 515 such as by way of a feed structure (e.g., a conductive wire or strip) coupled to a radio (not shown) located on a printed circuit board (PCB) within the metal electronic device case 500. In one implementation, the length of the elongated metal arm 515 is defined to resonate close to the lowest frequency of antenna operation.

It should be understood that multiple notches through the same side face edge or though different side face edges may also be employed. Other cut-out, notch, and feed structure configurations can result in different antenna efficiency bands that may correspond with frequencies used in any radio standard or protocol including without limitation UMTS, GSM, LTE, 4G, 3G, 2G, WiFi, WiMAX, Bluetooth, Miracast, and other standards or specifications that may be developed in the future.

A plurality of proximity sensors (not shown) collect proximity data from a field of view visible through or from each of a number of corresponding exposure points (e.g., exposure points 524 and 526) on an exterior surface of the metal computing device case 500. In FIG. 5, exposure points are shown on the insulating material filling the cut-out 514 and shown on the back face 504 in a corner region proximal to the elongated arm 515 and the cut-out 514. The positioning and number of the proximity sensors may vary depending on design criteria.

A proximity detection circuit (not shown) is communicatively coupled to one or more transmitting components of the back face antenna assembly 502, such as a radio or feed structure internal to the electronic device case 500. The proximity detection circuit receives proximity data from the proximity sensors and dynamically adjusts transmission power of the back face antenna assembly 502 based on the proximity data.

Figure 6:
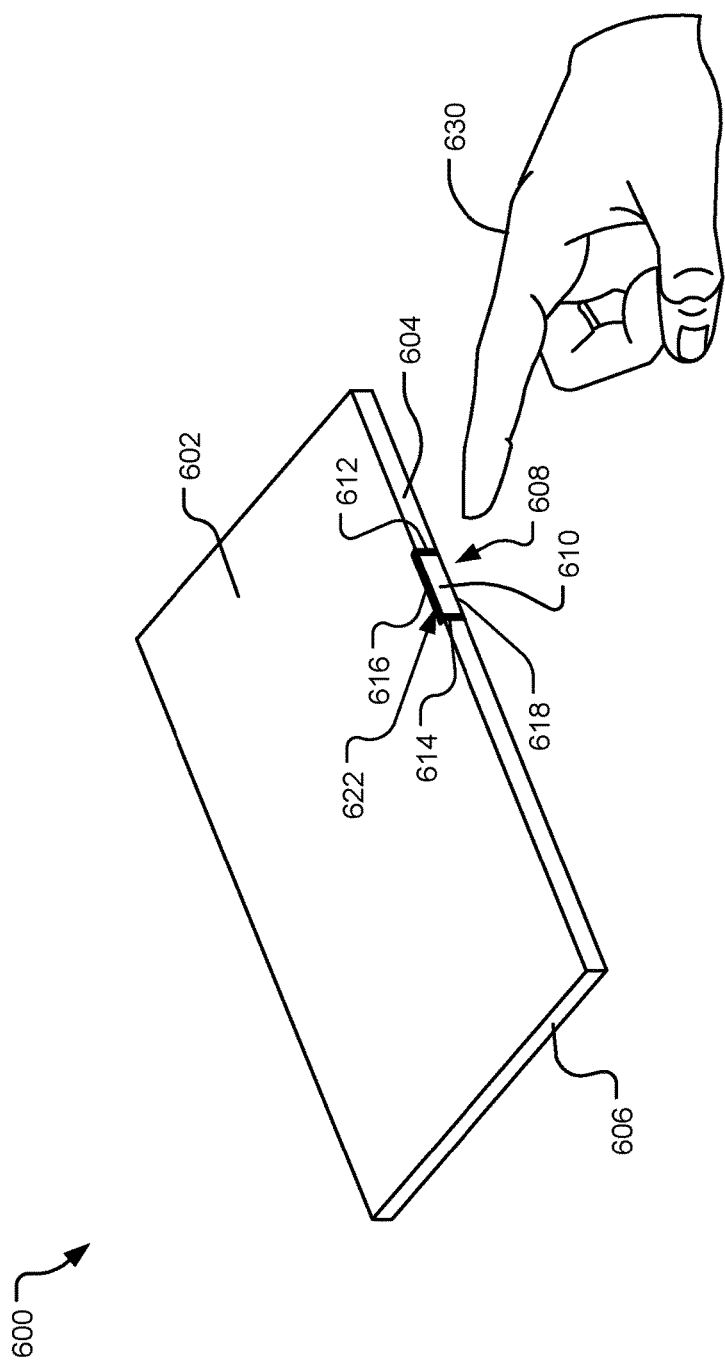
FIG. 6 illustrates another example metal computing device case that includes a radiating structure and components for proximity sensing.

FIG. 6 illustrates another example metal computing device case 600 that includes a radiating structure and components for proximity sensing. The computing device case 600 includes a back face 602, a front face (not shown) and four side faces including visible side faces 604 and 606. The metal computing device case 600 includes components to perform both a radiating function and a capacitance sensing function.

In particular, the metal computing device case 600 includes an antenna assembly 608 that transmits a carrier wave, such as an RF wave, and includes a part of the metal computing device case 600. As illustrated, antenna assembly 608 includes a metal plate 610 (e.g., part of the metal side face 604 of the metal computing device case 600 or another metal plate) separated from the metal side face 604, the metal back face 602, and the front face (not shown) by three cut-out slots 612, 614, and 616. It should be understood that the metal plate 610 may alternatively be formed as part of the back face 602 of the metal computing device case 600. The exterior surface of the metal plate 610 is exposed (e.g., the surface of the metal plate 610 is exposed to a user's environment, touchable by a user, etc.), and the interior surface of the metal plate 610 is coupled to a feed structure (not shown) within the interior of the metal computing device.

An insulator 622 (e.g., plastic or other dielectric material) fills each of the cut-out slots 612, 614, and 616. The insulator 622 provides insulation between the metal plate 610 and adjacent edges of the metal back face 602 and metal side face 604. Although not shown, the metal plate 610 may be insulated from the front face by a dielectric material, an insulating gasket, insulating contact with a glass layer in the front section of the device, etc.

In addition to performing a radiating function of the antenna assembly 608, the metal plate 610 acts as a capacitance pad for a capacitance sensing proximity sensor. When a conductive object 630, such as a human body part, approaches the metal plate 610, a measureable change in AC voltage of the metal plate 610 is observed. The conductive object 630 and the metal plate 610 effectively serve as parallel plates in a parallel plate capacitor; thus, the magnitude of the change in AC voltage depends on the "gap" size between the conductive object 630 and the metal plate 610.

If the distance between the conductive object and the metal plate 610 is less than a predetermined distance (e.g., a distance for which SAR regulations mandate a reduction in RF transmission power), the change in AC voltage exceeds a stored threshold value and a human proximity condition is satisfied. Responsive to satisfaction of the human proximity condition, a power control circuit (not shown) selectively alters (e.g., reduces) transmission power of the antenna assembly 608. When the human proximity condition is no longer satisfied, the power control circuit selectively alters (e.g., increases) transmission power of the antenna assembly 608.

Figure 7:
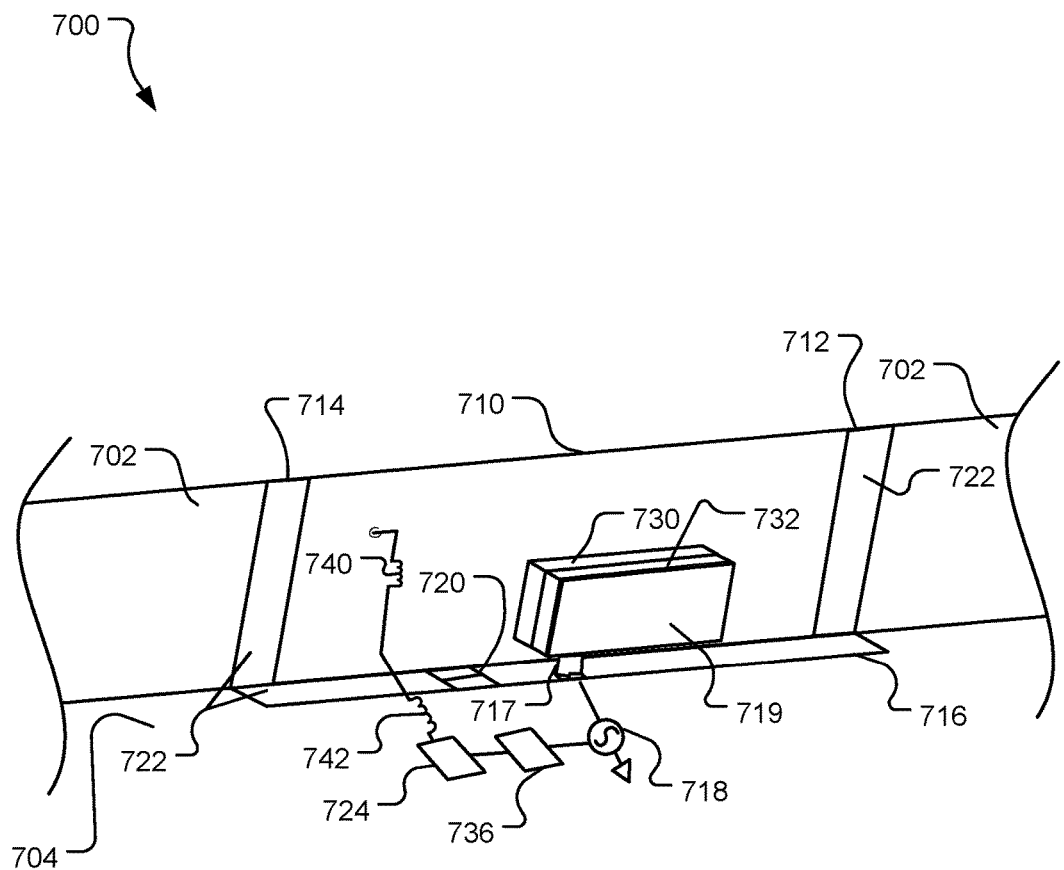
FIG. 7 illustrates example components of a system that includes a radiating structure and components for proximity sensing.

FIG. 7 illustrates example components of a system 700 that includes a radiating structure and components for proximity sensing. The system 700 is formed as part of a metal electronic device case including a metal side face 702, a metal back face 704, and a metal plate 710. The metal plate 710 forms an exterior metal surface of the metal computing device. Slots 712, 714, and 716 are filled with an insulator 722 (e.g., plastic), providing insulation between the metal plate 710 and the metal side face 702 and between the metal plate 710 and the metal back face 704 and closing gaps in the metal computing device case. In some implementations, the insulator 722 may have a voltage-dependent dielectric constant.

The system 700 includes components to perform both a radiating function (e.g., transmission of a carrier wave) and a capacitance sensing function. The radiating function is performed in part by a high dielectric constant ceramic block 732 capacitively coupled to the metal plate 710 across a dielectric spacer 730. The dielectric spacer 730 is fed by a feed structure 717, which is electrically connected between a radio 718 and a metallized surface 719 on the ceramic block 732. The radio 718 is coupled to a PCB (not shown) on the metal back face 704. The ceramic block 732 may operate as the only radiating structure or may operate as an active antenna in combination with the metal plate 710 and the rest of the surrounding metal computing device case acting as a parasitic antenna.

The metal plate 710 is connected to the ground plane of the metal back face 704 via a series and/or parallel resonant circuit 720, which may allow for multi-band operation. A capacitance sensing function of the system 700 is performed by the metal plate 710 and a proximity sensing circuit 724 (e.g., a capacitance sensing chip) electrically coupled to the metal plate 710. When a conductive object, such as a human, approaches the metal plate 710, a change in electrical charge on the metal plate 710 can be measured by the proximity sensing circuit 724. From this measurement, the distance between the metal plate 710 and the conductive object can be determined. In this implementation, metal plate 710 is itself an exposure point from which proximity sensing data is collected.

A transmission path between the metal plate 710 and the proximity sensing circuit 724 includes blocking circuitry comprising a plurality of inductors and/or resistors. In particular, FIG. 7 illustrates a first inductor 740 in series with a second inductor 742. The first inductor 740 is positioned closer to the metal plate 710 than the second inductor 742. In one implementation, the first inductor 740 is coupled directly to the metal plate and the second inductor 742 is coupled directly to the proximity sensing circuit 724.

The first inductor 740 is a low value inductor that functions to block a transmission signal generated by the radio 718, ensuring that a radiation function of the system 700 is unchanged or substantially unchanged by the proximity sensing system 724. In one implementation, the first inductor 740 has an inductance value substantially between 2 and 22 nanoHenry (nH). The second inductor 742 is a high value inductor that functions to prevent noise from the proximity sensing circuit 724 from affecting the radiating function of the metal plate 710. In one implementation, the second inductor 742 has an inductance of greater than about 100 nH. Inductor 740 is chosen to be high impedance at or close to the intended RF operating frequency of the antenna. The actual component value used is determined based on component parasitics and the frequency bands that are to be covered by the antenna (usually wanting to avoid having inductor 740 be self-resonant at or near the operating bands of the antenna in order to avoid losses in the antenna performance itself).

In one implementation, a resister is used in place of the second inductor 742. The principle in this implementation is that an open circuit (a very high resistance value) would essentially make the circuitry on the far side of the resistor invisible to the RF circuit/antenna function. Example RF specifications can be satisfied for chip resistor values of 1 kΩ or higher, and generally 10 kΩ or lower, although resistor values outside of this range may also be employed.

The proximity sensing circuit 724 is also communicatively coupled to a power control circuit 736, which controls power to one or more transmitting components of the system 700, such as the radio 718 or the feed structure 717. This coupling allows the power control circuit 736 to dynamically adjust transmission power of the system 700 based on the input from the proximity sensing circuit 724. For example, the proximity sensing circuit 724 may output a signal to the power control circuit 736 that indicates that a human proximity condition is met. Responsive to this signal, the power control circuit 736 dynamically adjusts transmission power of the radio 718.

Figure 8:
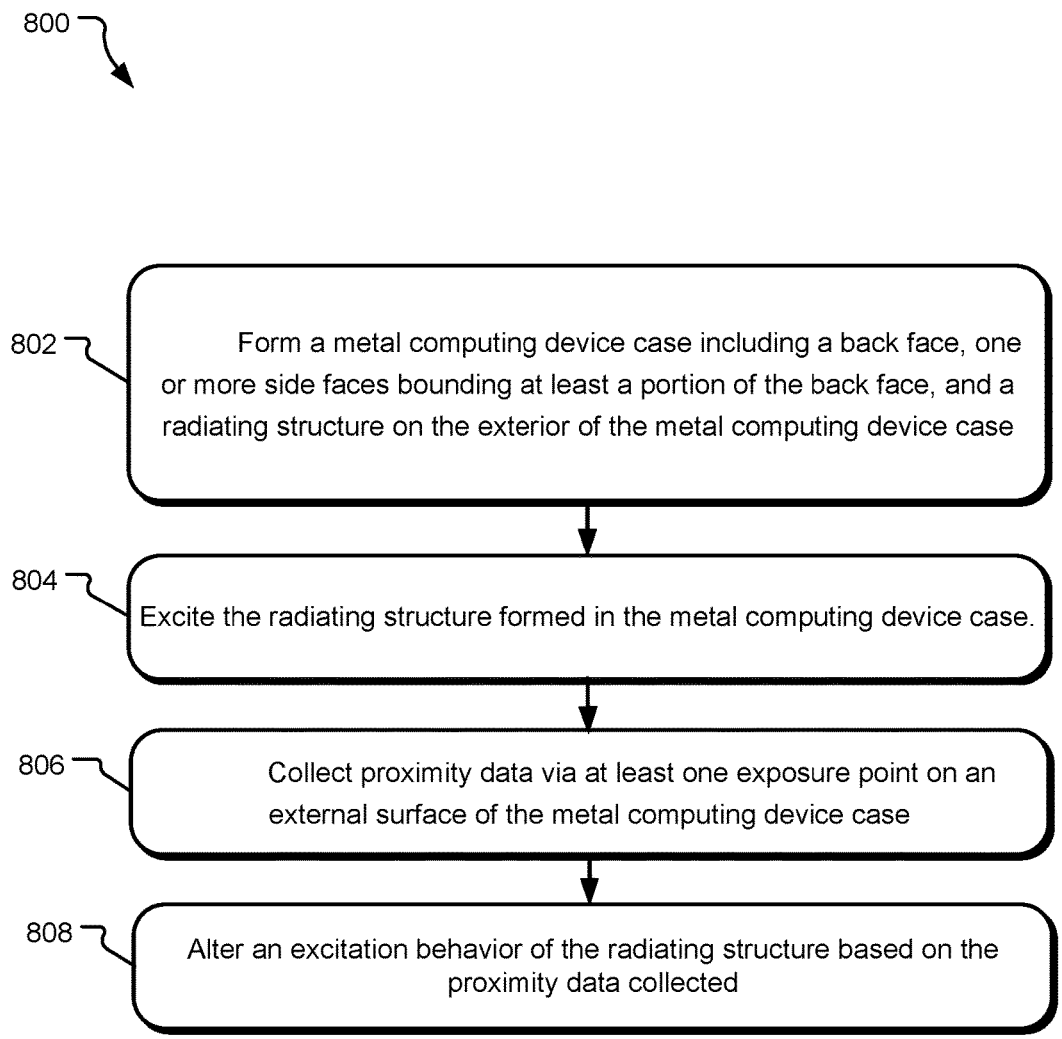
FIG. 8 illustrates example operations for using a proximity sensing system formed as part of a radiating structure in a metal computing device case.

FIG. 8 illustrates example operations 800 for using a proximity sensing system formed as part of a radiating structure in a metal computing device case. A forming operation 802 provides a metal computing device case including a metal back face and one or more metal side faces bounding at least a portion of the metal back face. In one implementation, the metal computing device case further includes a radiating structure having a ceramic block acting as a capacitive feed to a metal plate positioned on the exterior of the metal computing device case, such as in a metal side face or metal back face. A circuit (e.g., a series or parallel resonant circuit, a series inductor circuit, a switched inductor circuit, etc.) couples the metal plate to the ground plane of the metal computing device. Alternatively, the radiating structure may be in the form of a back face or side face antenna assembly as described with regard to FIG. 4 or 5, or some variations thereof.

An exciting operation 804 excites the radiating structure in the metal computing device case causing the radiating structure to radiate at one or more frequencies over time. A collection operation 806 collects proximity data from at least one exposure point on the exterior surface of the metal computing device.

An alteration operation 808 alters an excitation behavior (e.g., a transmission power) of the radiating structure based on the proximity data collected. For example, if the proximity data collected satisfies a human proximity condition, a transmission power of the radiating structure may be reduced. When the proximity data indicates that the human proximity condition is no longer satisfied (e.g., the human has moved away from a proximity sensor), transmission power of the radiating structure may be increased.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A system for detecting proximity of an object comprising:
a radiating structure including an insulator and a conductive radiating plate formed in an exterior surface of a computing device case, the computing device case substantially enclosing electronics of a computing device, the conductive radiating plate transmitting a radio-frequency carrier wave when fed by a radio-frequency signal; and
a proximity sensor including a capacitance sensing circuit configured to detect proximity of the object by sensing capacitance changes between the conductive radiating plate and the object, the conductive radiating plate being a capacitance pad of the capacitive sensing circuit.

2. The system of claim 1 wherein the conductive radiating plate is bounded by the insulator, the conductive radiating plate performing a radiating function of the radiating structure.

3. The system of claim 1, wherein a surface of the conductive radiating plate functions as an exposure point for detecting proximity of the object.

4. The system of claim 1 further comprising:
a first inductor and a second inductor in series between the conductive radiating plate and the capacitance sensing circuit, the first inductor having a lower inductance value than an inductance value of the second inductor.

5. The system of claim 1 further comprising:
an inductor and a resistor in series between the conductive radiating plate and the capacitance sensing circuit, the resistor being closer to the capacitance sensing circuit than the inductor.

6. The system of claim 1 further comprising:
control circuitry configured to alter transmission power of the radiating structure responsive to a measurement of the proximity sensor satisfying a human proximity condition.

7. The system of claim 1 wherein the radiating structure includes a ceramic block that capacitive couples to the conductive radiating plate to drive the conductive radiating plate to produce the radio-frequency carrier wave when fed by the radio-frequency signal.

8. A device for detecting proximity of an object comprising:
a conductive radiating plate integrated into a computing device case, the computing device case-substantially enclosing electronics of the device, the conductive radiating plate transmitting a radio-frequency carrier wave when fed by a radio-frequency signal;
an insulator positioned adjacent to the conductive radiating plate; and
a proximity sensor including a capacitance sensing circuit configured to detect proximity of the object by sensing capacitance changes between the conductive radiating plate and the object, the conductive radiating plate being a capacitance pad of the capacitive sensing circuit.

9. A method for detecting proximity of an object comprising:
feeding a radiating structure with a radio-frequency signal to transmit a radio-frequency carrier wave, the radiating structure including an insulator and a conductive radiating plate formed in an exterior surface of a computing device case, the conductive computing device case substantially enclosing electronics of a computing device; and
detecting proximity of the object via a capacitance sensing circuit configured to sense capacitance changes between the conductive radiating plate and the object, the conductive radiating plate being a capacitance pad of the capacitive sensing circuit.

10. The method of claim 9 further comprising:
responsive to the detection operation, altering a transmission power of the radiating structure, responsive to satisfaction of a human proximity condition.

11. The method of claim 9 wherein the conductive radiating plate performs a radiating function of the radiating structure and functions as an exposure point from which the proximity is detected.

12. The method of claim 9 wherein the conductive radiating plate is bounded by the insulator.

13. The method of claim 9 further comprising:
blocking a transmission signal generated by a radio from affecting the capacitance sensing circuit, transmission signal being blocked via a first inductor; and
blocking noise from the capacitance sensing circuit from affecting a radiating function of the conductive radiating plate via a second inductor, the first inductor being positioned in series with the second inductor, the first inductor having a lower inductance value than an inductance value of the second inductor.

14. The method of claim 9 wherein an inductor and a resistor are electrically connected between the conductive radiating plate and the capacitance sensing circuit.

15. The method of claim 8, further comprising: blocking a signal transmitted by the conductive radiating pad from affecting the capacitance sensing circuit; and blocking noise from the capacitance sensing circuit from affecting a radiating function of the conductive radiating plate.

16. The device of claim 8, further comprising:
blocking circuitry configured to block a signal transmitted by the conductive radiating plate from affecting the capacitance sensing circuit while also blocking noise from the capacitance sensing circuit from affecting a radiating function of the conductive radiating plate.

17. The device of claim 8 wherein the conductive radiating plate is bounded by the insulator, the conductive radiating plate performing a radiating function of a radiating structure.

18. The device of claim 8 wherein a surface of the conductive radiating plate functions as an exposure point for detecting proximity of the object.

19. The device of claim 8 further comprising:
a first inductor and a second inductor in series between the conductive radiating plate and the capacitance sensing circuit, the first inductor having a lower inductance value than an inductance value of the second inductor.

20. The device of claim 8 further comprising:
an inductor and a resistor in series between the conductive radiating plate and the capacitance sensing circuit, the resistor being closer to the capacitance sensing circuit than the inductor.

21. The device of claim 8 further comprising:
control circuitry configured to alter transmission power of a radiating structure including the conductive radiating plate responsive to a measurement of the proximity sensor satisfying a human proximity condition.

22. The device of claim 8 further comprising:

a ceramic block that capacitive couples to the conductive radiating plate to drive the conductive radiating plate to produce the radio-frequency carrier wave when fed by the radio-frequency signal.

23. The system of claim 1, further comprising:

blocking circuitry configured to block a signal transmitted by the conductive radiating plate from affecting the capacitance sensing circuit while also blocking noise from the capacitance sensing circuit from affecting a radiating function of the conductive radiating plate.

* * * * *